US012742102B2

(12) United States Patent
Gahlmann

(10) Patent No.: US 12,742,102 B2
(45) Date of Patent: Sep. 22, 2026

(54) VERY LOW-EMISSION, SOLVENT-, PLASTICIZER-, COALESCENT-, FILLER- AND LIGHT FILLER-FREE AQUEOUS DISPERSION PARQUET ADHESIVE WITH LOW DENSITY AND PARTICULARLY ADVANTAGEOUS MECHANICAL PROPERTIES

(71) Applicant: STAUF KLEBSTOFFWERK GMBH, Wilnsdorf (DE)

(72) Inventor: Frank Gahlmann, Hilchenbach (DE)

(73) Assignee: Stauf Klewbstoffwerk GmbH, Wilnsdorf (DE)

( * ) Notice: Subject to any disclaimer, the term of this patent is extended or adjusted under 35 U.S.C. 154(b) by 226 days.

(21) Appl. No.: 18/349,274

(22) Filed: Jul. 10, 2023

(65) Prior Publication Data

US 2024/0010885 A1 Jan. 11, 2024

(30) Foreign Application Priority Data

Jul. 11, 2022 (EP) .................................... 22184173

(51) Int. Cl.
*C09J 11/06* (2006.01)
*C09J 131/04* (2006.01)

(52) U.S. Cl.
CPC ............ *C09J 131/04* (2013.01); *C09J 11/06* (2013.01); *C09J 2301/312* (2020.08); *C09J 2301/50* (2020.08)

(58) Field of Classification Search
None
See application file for complete search history.

(56) References Cited

U.S. PATENT DOCUMENTS 9,919,506 B2 3/2018 Bauers et al.
2011/0201727 A1* 8/2011 Hashemzadeh ......... C08L 83/00 524/3
2016/0289512 A1 10/2016 Bauers et al.

FOREIGN PATENT DOCUMENTS

WO WO 01/18143 A1 3/2001
WO WO 2015/071095 A1 5/2015

OTHER PUBLICATIONS

Mowiol 4-88 product notes (Year: 2025).*
Canadian Intellectual Property Office, Examination Report in Canadian Patent Application No. 3,201,301 (Sep. 12, 2024).
"4.5.1 Mindestfilmbilde-Temperatur (MFT)" (Minimum Film Forming Temperature (MFT)), *Wäßrige Polymerdispersionen: Synthese, Eigenschaften, Anwendungen* (Aqueous polymer dispersions: synthesis, properties, applications), Dr. Dieter Distler, Editor; Wiley-VCH Verlag GmbH (1999) p. 51.
Elias, "Molar Masses and Degrees of Polymerization," Chapter 2.3, *Macromolecules, Volume 3: Physical Structures and Properties*, Wiley-VCH Verlag Gmbh & Co. KGaA, Weinheim, Germany (2008); pp. 16-29 (9 pgs.).
Gysau, "Definition von Fullstoffen und Pigmenten" (Definition of Fillers and Pigments), *Füllstoffe—Grundlagen und Anwendungen* (Fillers—Basics and Applications) Chapter 1.3 (pp. 18-19) Vincentz Network GmbH & Co. KG, Hanover; Germany (2005) (7 pgs).
Meier, *"Weichmacher" (Plasticizer), Ch. 5, Taschenbuch der Kunststoff-Additive*, 3rd edition, Editors: R. Gächter and H. Müller; Carl Hanser Verlag München Wien, Germany, (1989) pp. 341-351.
Mezger; "Chapter 2.3 Shear stress-dependent flow behavior," *Das Rheologie-Handbuch* (The Rheology Hanbook), Curt R. Vincentz Verlag, Hanover; Germany (2000) 24 pgs.
Poth, "Chapter 3.4.4 Polyvinyl alcohols," *Synthetische Bindemittel für Beschichtungssysteme* (Synthetic binders for coating systems), Vincentz Network GmbH & Co. KG, Hanover, Germany (2016) p. 382.
European Patent Office, Extended European Search Report in European Patent Application No. 22 184 173.7 (Dec. 22, 2022).

* cited by examiner

*Primary Examiner* — Catherine S Branch
*Assistant Examiner* — Huihong Qiao
(74) *Attorney, Agent, or Firm* — Leydig, Voit & Mayer, Ltd.

(57) ABSTRACT

Disclosed is an aqueous dispersion parquet adhesive based on at least one dissolved polyvinyl alcohol, at least one dispersed, vinyl acetate-containing polymer, and at least one dispersed, acrylate-containing polymer. The dispersion parquet adhesive has low density, excellent processing properties, and advantageous mechanical properties. The dispersion parquet adhesive according to the invention has an exceptionally high weight ratio of polymeric binder to water and a defined weight ratio of dissolved polymeric binder to dispersed polymeric binder. Also disclosed is a method of producing the parquet adhesive.

19 Claims, No Drawings

VERY LOW-EMISSION, SOLVENT-, PLASTICIZER-, COALESCENT-, FILLER- AND LIGHT FILLER-FREE AQUEOUS DISPERSION PARQUET ADHESIVE WITH LOW DENSITY AND PARTICULARLY ADVANTAGEOUS MECHANICAL PROPERTIES

CROSS-REFERENCE TO A RELATED APPLICATION

This patent application claims the benefit of European Patent Application No. 22 184 173.7, filed on Jul. 11, 2022.

DESCRIPTION

Aqueous dispersion parquet adhesives based on vinyl acetate-containing polymers have been used to bond parquet flooring for decades. The curing mechanism of these adhesives is based on the formation of a film by polymer particles dispersed in water, so-called latex particles, said film formation being triggered by the evaporation of water or the release thereof to the surrounding substrates and/or subsurfaces. Once the adhesive has been applied, the latex particles gradually move closer to each other, increasingly come into contact with each other, film over, and ultimately form a closed polymer film which bonds the subsurface to the substrate that is to be bonded. A protective colloid potentially contained in the dispersion, such as polyvinyl alcohol, keeps the latex particles apart and thus prevents premature coagulation of the dispersion during storage.

Over their decades-long development phase, dispersion parquet adhesives based on vinyl acetate homopolymers and copolymers have developed into reliable products with satisfactory strengths and processing properties. Even the disadvantageous wood swelling effect, which is unavoidable due to the water content, is at an acceptable level. The comparatively low wood swelling effect is brought about by a high proportion of mineral fillers, which limits the water content and thus also the swelling of the parquet to an acceptable level. Calcium carbonate fillers, which are predominantly used, are inexpensive and are not hazardous to the environment or to health. They are contained in all commercially available dispersion parquet adhesives, usually in the higher double-digit percentage range, and generally constitute the main component. The polymeric binder content in conventional dispersion parquet adhesives is typically 15 to 25 wt %. To facilitate dispersion of the polymeric binders and of other components of the composition, and to set good processing properties, the water content is usually somewhat higher than the polymer content, so that the weight ratio of polymer to water leads to quotients of around 0.6 to 0.9.

The mineral fillers give the ready-to-use adhesive a pasty consistency with pseudoplastic rheology, i.e., the adhesive is easy to apply by hand using a notched trowel and leads to a stable rib stability of the adhesive beads created. The viscosities $\eta$ of the dispersion parquet adhesives typically lie in the range from 50,000 to 200,000 mPa·s (rotational viscometer Brookfield DV2T-RV, spindle no. R7, spindle speed 20 rpm, temperature 20° C.; DIN EN ISO 2555:2018-09). The pseudoplastic rheological behavior can be seen from the shape of the curve showing the viscosity as a function of the shear rate. For the sake of simplicity, the shape of the curve is not determined in full, but rather a three-point measurement is carried out, i.e., the viscosity is measured at three different speeds; at 20 rpm, 5 rpm and 1 rpm. The size of the quotients between these measured values gives an indication of the shape of the viscosity-shear rate curve. The quotients of the viscosities [$\eta$(20 rpm)÷ $\eta$(5 rpm)] and [$\eta$(20 rpm)÷ $\eta$(1 rpm)] are a measure of the steepness of the drop in the viscosity-shear rate curve as the shear rate increases. The quotients are also referred to as structural factors (STF 20/5 and STF 20/1). Dispersion parquet adhesives exhibit a pronounced structurally viscous behavior when the structural factor STF 20/5 is ≤0.45 and the structural factor STF 20/1 is ≤0.17. Structural factors are dimensionless quantities. The smaller the value thereof, the more pronounced the pseudoplasticity.

In practice, the processing properties of dispersion parquet adhesives are assessed by the parameters "ease of spreadability" and "robustness/stability of the adhesive ribs created using a notched trowel". These two properties are tested manually and evaluated using grades (1 to 6 in increments of 0.5). They have their quantitative correlate in the measured viscosity (n at 20 rpm) and pseudoplasticity (STF 20/5 and STF 20/1). The interplay between viscosity and pseudoplasticity influences the processing properties. For instance, a comparatively high-viscosity adhesive with very low structural factors, i.e., a pronounced pseudoplastic flow behavior, may have processing properties that are just as good as or better than those of an adhesive with lower viscosity but higher structural factors.

The open times of at least 20 minutes that are necessary for a dispersion parquet adhesive can also be set using mineral fillers. After curing, the adhesive is virtually a composite material with high tensile shear strengths—suitable for withstanding the dynamic and static shear forces that occur during use of the parquet and seasonal fluctuations in the wood moisture content.

The reduced water content of the dispersion parquet adhesives of around 25±5 wt %, brought about by the addition of filler, is in practice associated with an acceptable wood swelling effect of less than 0.6% lateral expansion in the wood swelling test. On the other hand, however, the high mineral filler content leads to a rather low elasticity and deformability of the adhesives—as can be seen from the high moduli of elasticity and low tensile elongations at break.

In order to be able to absorb the short-term dynamic loads that occur during use of the parquet, such as those caused by jumping, running/stopping, moving furniture or dropping heavy objects, the adhesive should exhibit an elastic behavior. Otherwise, there would be a risk of breakage of the adhesive joint or of the subsurface, with the resulting problems such as detachment of the parquet elements or destruction of the subsurface. On the other hand, the elastic behavior of the adhesive must not be too pronounced, since otherwise a necessary level of dimensional stability of the bond cannot be guaranteed.

Ideally, dispersion parquet adhesives in the cured state have a modulus of elasticity of 10 to 120 N/mm$^2$ (test conditions DIN EN ISO 527-1:2019-12 and DIN EN ISO 527-3:2019-02). Higher or lower moduli of elasticity are disadvantageous for parquet bonding. If the values deviate significantly (modulus of elasticity in the high three-digit range), severe damage patterns, such as subsurfaces broken into palm-sized chunks, are also to be expected.

Besides the modulus of elasticity, the tensile elongation at break is another important parameter for characterizing the mechanical properties of a dispersion parquet adhesive and gives an indication of the maximum deformability thereof. Like the modulus of elasticity, this is measured under tensile load. A cured adhesive film is stretched until it tears, and the extension immediately prior to tearing is determined in comparison to the initial length. Tensile elongations at break are to be seen as related to the modulus of elasticity. In order to prevent tearing of the adhesive joint when working wood, adhesives with a low modulus of elasticity require high tensile elongations at break. However, the reverse is not true. Adhesives with a high modulus of elasticity may also have a high tensile elongation at break. To reliably avoid a break in cohesion of the adhesive even in the event of very large variations in the wood moisture content and very large changes in the dimensions of the wood as a result thereof, dispersion parquet adhesives ideally have tensile elongations at break of 75%, measured in accordance with the standard DIN EN ISO 527-1:2019-12.

One basic prerequisite for functional dispersion parquet adhesives is sufficient strength. The requirements in respect of this are specified in the industry standard DIN EN ISO 17178:2020-06 with regard to tensile shear strength and shear elongation. Different requirements apply to elastic, hard-elastic and hard parquet adhesives. For a hard parquet adhesive, the tensile shear strength must be greater than or equal to 3.0 $N/mm^2$. For this test, the test specimens are briefly pressed together after bonding, resulting in an adhesive joint with a small layer thickness (not defined in any greater detail). The tensile shear strength must be greater than or equal to 2.0 $N/mm^2$ for a hard-elastic parquet adhesive, and greater than or equal to 1.0 $N/mm^2$ for an elastic parquet adhesive. An adhesive joint thickness of 1.0±0.3 mm is prescribed for these two tests. Additionally, in the tensile shear strength test, a hard-elastic adhesive must have a shear elongation of 0.5, and an elastic adhesive must have a shear elongation of 1.0. The shear elongation is a dimensionless quantity. It indicates the ratio of the maximum stretch of the adhesive joint in the tensile direction to the thickness of the adhesive joint in the tensile shear strength test. The requirements in respect of tensile shear strength and shear elongation must be met for all adhesives after a curing time of 3 days and 28 days.

Besides the strength achieved by the fully cured adhesive, the strength development in the period immediately after bonding, the so-called setting rate, is also important in the case of dispersion parquet adhesives. The strength has to build up at the correct rate, i.e., it must not be too quick and must be in line with the water absorption rate of the wood. The absorption of water by the wood takes place over a few hours. If the strength builds up too quickly, the parquet elements are, to put it simply, fixed in place before the wood can swell and expand. This would result in high stresses, which would ultimately destroy the subsurface as the generally weakest component. The explosive power of wood is known from historical stone-working and mining. A setting rate that is slow enough in practice exists when the tensile shear strength of the pressed test specimens one hour after the parquet has been laid is ≤0.8 $N/mm^2$ (test conditions: DIN EN ISO 17178:2020-06).

Besides the mechanical properties, the adhesion properties of the dispersion parquet adhesives are also important for secure parquet bonding. On the one hand, parquet is made from various types of wood (beech, oak, ash, alder, larch, spruce, pine, Douglas fir, walnut, birch, maple, cherry, olive, bamboo, acacia, robinia, ipe lapacho, doussie, jatoba, cumaru, mahogany, merbau, wenge, zebrano, iroko, kambala, cedar, etc.) with a wide variety of chemical compositions and physical properties. On the other hand, the subsurfaces to which the parquet will be permanently bonded have completely different properties than wood. Here, the adhesive must be able to build up good adhesion to different subsurfaces, such as concrete, cement screed, cement flowing screed, calcium sulfate screed, calcium sulfate flowing screed, sanded mastic asphalt, OSB boards, particleboards, gypsum fiberboards, cement-bound wood fiberboards, wooden planks, cement-based leveling compounds, calcium sulfate-based leveling compounds, dispersion-based leveling compounds, ceramic tiles, natural stone, drywall boards, and many others. The adhesion properties can be determined via tensile shear strength measurements using the so-called Presso Mess device on corresponding substrates and subsurfaces.

Another aspect that is increasingly coming into focus is the specific weight of the adhesives. Due to their high mineral filler content, commercially available dispersion parquet adhesives typically have densities in the range from 1.4 to 1.6 $g/cm^3$. Since dispersion parquet adhesives are applied to the subsurface not by weight, but rather by volume, there is a desire from customers for adhesives that have lower densities of 1.1 $g/cm^3$. For an identical volume, these would have the advantage of lower transport and storage costs (transport weight, fuel consumption, shelf load, resource efficiency, etc.), and on account of the reduced weight would be easier for the user to handle, e.g., when being transported on the construction site. However, attempts to meet this desire and to significantly lower the density of the adhesives by incorporating lightweight fillers lead only to limited success. Lightweight fillers are, in particular, gas-filled hollow spheres made of e.g., glass, silicates, plastic (e.g., Expancel®) or ground porous minerals such as pumice or expanded perlite. Due to their very low densities, microscopic hollow bodies can be used to achieve significant reductions in density, but this is associated with disadvantages regarding the processing properties and mechanical characteristics. In particular, the tensile shear strength and tensile elongation at break suffer significantly.

But the rheology is also adversely affected. Good pseudoplastic rheology manifests as easy spreadability, a stable rib stability of the adhesive beads created using the notched trowel (in each case grade 1 to 2.5) and structural factors of STF (20/5)≥0.45 and STF (20/1)≥0.17. Dimensionally stable adhesive beads are necessary in order to bridge unevenness of the subsurface and deformations/dimensional deviations of the parquet elements (deviations from absolute flatness), so that the parquet is bonded to the subsurface across the full area and in as cavity-free a manner as possible. Any pseudoplasticity losses of the lightweight filler-filled dispersion parquet adhesives lead to unstable, run-prone adhesive beads (grade 4 to 5) and have structural factors above the defined limit values for STF (20/5) and STF (20/1). Owing to the large particle size of the lightweight fillers, the adhesive also appears sandy and gritty during application, and the spreadability is impaired (grade 3 to 5).

The disadvantages brought about by lightweight fillers, particularly with regard to the rheological and mechanical properties of dispersion parquet adhesives, may have various causes. In conventional dispersion parquet adhesives, the rheological and mechanical properties are in particular significantly determined by the interactions of the polymeric binders (usually vinyl acetate copolymers) with the mineral fillers (predominantly calcium carbonate). Mineral fillers typically have a mean particle diameter of 0.02 μm to 70 μm. Lightweight fillers in the form of hollow bodies have a mean particle diameter of typically 50 μm to 200 μm. The particle size distribution of lightweight fillers contains fractions up to a particle diameter of around 500 μm. The significantly larger particles of the lightweight fillers significantly impair the rheological and mechanical properties of the dispersion parquet adhesives. Added to this is the fact that lightweight fillers based on the otherwise mainly used calcium carbonates are not available. Further disadvantages may be caused by damaged hollow bodies and fragments thereof, deformations, and effects of diffusion into the cavities. Since the hollow bodies are susceptible to damage, the effort involved in producing dispersion parquet adhesives containing lightweight fillers is also greater than those containing conventional mineral fillers. By way of example, lightweight fillers must be incorporated into the dispersion under reduced shear forces.

Proceeding from this prior art, the object of the present invention is to provide a dispersion parquet adhesive which has a low density, good processing properties, suitable mechanical properties, and a suitable open time.

A further object of the invention is to provide a method for producing the dispersion parquet adhesive according to the invention and for using it to bond parquet, wood-block paving, bamboo and other wood material-based floor coverings to subsurfaces that are customary in interior design, under the objectives specified for the dispersion parquet adhesive.

Advantageously, the aim is to provide a dispersion parquet adhesive which has all or some of the following advantages: It should have a density of ≤1.1 g/cm$^3$, should ensure easy spreadability and a stable rib stability, should have a pseudoplastic rheology with suitable processing viscosity, and should ensure an open time of at least 20 minutes. In addition, it should meet the minimum requirements of the industry standard for parquet adhesives in accordance with DIN EN ISO 17178:2020-06 in respect of tensile shear strength and shear elongation.

This object is surprisingly achieved by a dispersion parquet adhesive and the production and the use thereof according to the invention as described herein. Advantageous developments of the parquet adhesive according to the invention are also described.

The composition of the dispersion parquet adhesive according to the invention is based on a specific composition consisting of at least three polymeric binders. The weight ratio of the sum of these polymers to water is exceptionally high for a dispersion parquet adhesive. It is 1.5:1 to 3:1, more preferably 1.6:1 to 2.7:1. Particular preference is given to 1.7:1 to 2.6:1. Therefore, on average less than half of one unit of weight of water is available per one unit of weight of polymer. This is a significant difference from the prior art, in which dispersion parquet adhesives have ratios of polymeric binder to water of around 0.6:1 to 0.9:1. In this case, more than one unit of weight of water is available per unit of weight of polymer.

To produce the dispersion parquet adhesive according to claim 15 in the manner according to the invention, it is necessary, unlike in the case of conventional dispersion parquet adhesives, to add further polymeric binder as a solid, in the form of a water-dispersible dispersion powder, to an already existing concentrated polymer dispersion/polymer solution.

Another difference from conventional dispersion parquet adhesives is the greatly limited filler content of the composition according to the invention. The filler content is at most 5 wt % and preferably at most 2 wt %. Particularly preferred embodiments of the composition according to the invention are free of fillers. In contrast, conventional dispersion parquet adhesives typically have a mineral filler content in the higher double-digit percentage range. The desired reduction in density of the dispersion parquet adhesive according to the invention is achieved by largely omitting mineral fillers. However, the surprising thing about the composition according to the invention is not the density reduction effect, but rather the fact that a composition suitable for use as a dispersion parquet adhesive can even be achieved with an exceptionally high ratio of polymer to water while simultaneously lacking fillers. A person skilled in the art would have expected at this point a partially clumped, difficult-to-process dispersion with Newtonian rheology, high viscosity, a significant wood swelling effect, and insufficient mechanical properties. In particular, what would have been expected is a tough spreadability, an insufficient rib stability and an excessively low modulus of elasticity, resulting in insufficient dimensional accuracy of the bonded parquet. What is even more surprising is that the composition according to the invention not only can somehow be used as a dispersion parquet adhesive, but also, in comparison to conventional dispersion parquet adhesives, has completely unexpected, exceptionally advantageous properties. These include the optimum modulus of elasticity of 10 to 120 N/mm$^2$ (Table 2, row XIV), the high tensile elongation at break of significantly more than 75 N/mm$^2$ (Table 2, row XIII), the high shear elongation after 3 days and 28 days of curing time of significantly more than 1.0 (Table 2, rows VIII and XII), the excellent pseudoplastic rheology with good spreadability (grades 1 to 2, Table 2, row IV), stable adhesive beads (grade 1, Table 2, row V) and suitable structural factor STF 20/5 of less than or equal to 0.45 (Table 2, row II) and structural factor STF 20/1 of less than or equal to 0.17 (Table 2, row III), as well as the more than significant overfulfilment of the requirements for a parquet adhesive according to the industry standard DIN EN ISO 17178:2020-06 with regard to tensile shear strength and shear elongation. The standard is divided into three parts, each with different requirements in respect of a hard, elastic and hard-elastic parquet adhesive (page 3, section 2). It is absolutely surprising that the dispersion parquet adhesive according to the invention meets not just one of the three requirements, but all three simultaneously (Table 2, rows VI, VII, VIII and X, XI and XII).

Added to this is the low specific weight of the dispersion parquet adhesive according to the invention (Table 2, row XVIII), with the resulting advantages in respect of the costs of storage and logistics as well as easier handling for the processor. To bond a certain surface area of parquet, it is easier for the processor to carry to the third floor two buckets weighing 11 kg each, for example, than two buckets weighing 15 kg each.

In its particularly preferred embodiment, the dispersion parquet adhesive according to the invention is not only free of fillers and lightweight fillers, but also free of coalescing agents, plasticizers, organic solvents and other very volatile to very semi-volatile organic compounds. Particularly preferred embodiments are therefore not hazardous to the environment or to health and are label-free according to the international GHS labelling system and the German Hazardous Substances Ordinance. In addition, they have very low emissions and meet the requirements of Emicode Class EC 1 Plus of the Gemeinschaft Emissionskontrollierte Verlegewerkstoffe, Klebstoffe and Bauprodukte e.V., Dusseldorf (GEV).

Another aspect that is increasingly coming into focus concerns sustainability. Particularly preferred embodiments of the parquet adhesive according to the invention that are free of fillers and lightweight fillers do not form a composite material after curing, but rather a homogeneous plastic. This brings advantages in respect of the disposal of used material, e.g., in waste incineration plants. The plastics resulting from filler-free dispersion parquet adhesives according to the invention therefore have a higher calorific value and better combustion behavior than the composite materials resulting from conventional, filler-containing dispersion parquet adhesives that typically consist of 60 to more than 70 wt % of non-combustible mineral fillers. In addition, the former burn without residue, whereas the latter cause a significant percentage of ash, which in turn has to be disposed of separately. After curing, the filler-free adhesive is a pure plastic consisting of a polymer blend, which additionally means considerable advantages in respect of recycling possibilities and possible uses of the recycled material. For dispersion parquet adhesives according to the invention that have a low filler content, the sustainability advantages over conventional dispersion parquet adhesives are also significant, albeit somewhat less pronounced than in the case of the filler-free dispersion parquet adhesives according to the invention.

Another advantage of the dispersion parquet adhesive according to the invention results from its appearance. Particularly preferred embodiments free of fillers and lightweight fillers appear transparent, while preferred embodiments with a filler and lightweight filler content of not more than 2 wt. % appear opaque. In these embodiments, the dispersion parquet adhesive according to the invention is open to coloration. Using appropriate pigments and/or dyes, this allows the adhesive joint to be color-matched to the color scheme of the parquet or floor covering. This is an aesthetic enrichment that no conventional parquet adhesive can offer.

With regard to bonding parquet, wood-block paving, bamboo and other wood material-based floor coverings to subsurfaces customary in interior design, the dispersion parquet adhesive according to the invention has the following advantages over dispersion parquet adhesives according to the prior art, the first four of these advantages being surprising to a person skilled in the art:

1. Modulus of elasticity of 10 to 120 N/mm$^2$
2. Tensile elongation at break of ≥75%
3. Simultaneously meets the requirements for a hard, hard-elastic and elastic parquet adhesive due to the tensile shear strength and shear elongation γ after 3 and 28 days of curing time (of more than 3.0 N/mm$^2$ for pressed test specimens, or more than 2.0 N/mm$^2$ at 1 mm thickness of the adhesive joint and a shear elongation of significantly more than 1.0 at 1 mm thickness of the adhesive joint)
4. Excellent pseudoplastic rheology with good spreadability and stable adhesive beads (grades 1 to 2.5) at a viscosity of 50,000 to 200,000 mPa·s and a pronounced pseudoplastic rheology with STF 20/5≤0.45 and STF 20/1≤0.17
5. Low density of ≤1.1 g/cm$^3$
6. Non-hazardous to the environment and to health (low or zero content of very volatile to very semi-volatile organic compounds)
7. Advantages in thermal disposal and recycling (low or zero filler content)
8. Sustainable and resource-efficient due to the savings on fillers (energy-intensive breakdown, cleaning, grinding, modification, filling, storage and transport of the fillers), the reduction in density (storage, logistics and handling of dispersion parquet adhesives), and the recycling and disposal options.
9. Color matching of the adhesive joint to the appearance of the parquet or other wood material-based floor coverings.

In addition, it is surprising that the wood swelling effect of the dispersion parquet adhesive according to the invention is just as low as in the case of conventional dispersion parquet adhesives. This was not to be expected, since the dispersion parquet adhesive according to the invention has a higher absolute water content of around 33±5 wt %—compared to conventional dispersion parquet adhesives with around 25±5 wt %. However, the wood swelling after bonding of the parquet is just as low with the dispersion parquet adhesive according to the invention as with conventional dispersion parquet adhesives and remains below the limit value of 0.6% lateral expansion in the wood swelling test (Table 2, row XV).

Furthermore, the setting rate of the dispersion parquet adhesive according to the invention is slow enough to avoid any damage-causing stress loads on the subsurface. After a setting time of one hour, the tensile shear strength in accordance with DIN EN ISO 17178:2020-06 is significantly less than 0.8 N/mm$^2$ (Table 2, row XVI).

Furthermore, the dispersion parquet adhesive according to the invention exhibits the open time of at least 20 minutes that is required for bonding parquet (Table 2, row IX). It is limited in the upward direction to around 60 minutes.

Furthermore, a good adhesion of different wood coverings and types of wood to different substrates that are customary in interior design is ensured with the dispersion parquet adhesive according to the invention.

According to the invention, the ready-to-use aqueous dispersion parquet adhesive, which is suitable for bonding parquet, wood-block paving, bamboo and other wood material-based floor coverings to subsurfaces customary in interior design, contains or consists of up to 39 wt % of water and at least the following three polymeric binders:

a) at least 4 wt % of at least one dissolved polyvinyl alcohol,
b) at least 20 wt % of at least one water-insoluble, dispersed, vinyl acetate-containing polymer, and
c) at least 3 wt % of at least one water-insoluble, dispersed, acrylate-containing polymer, wherein
   the weight ratio of the sum of all the dissolved and dispersed polymeric binders present in the composition to water is 1.5:1 to 3:1, and
   the weight ratio of the sum of all the dispersed polymeric binders present in the composition to the sum of all the dissolved polymeric binders present in the composition is 3:1 to 15:1, and
   at most 2 wt % of very volatile to very semi-volatile organic compounds (including coalescing agents, plasticizers and organic solvents) are contained therein, and
   at most 5 wt % of fillers (including lightweight fillers) are contained therein, and
   the pH is adjusted to neutral or alkaline, and
   the sum of water, fillers, very volatile to very semi-volatile organic compounds, pH adjusters and polymeric binders (a) to (c) is less than or equal to 100%.

Preferably, the ready-to-use aqueous dispersion parquet adhesive according to the invention contains or consists of 27 to 39 wt % of water and at least the following three polymeric binders:

a)≥4 to 16 wt % of at least one dissolved polyvinyl alcohol,
b)≥20 to 65 wt % of at least one water-insoluble, dispersed vinyl acetate copolymer, and c) ≥3 to 33 wt % of at least one water-insoluble, dispersed acrylate copolymer, wherein the weight ratio of the sum of all the dissolved and dispersed polymeric binders present in the composition to water is 1.6:1 to 2.7:1, and the weight ratio of the sum of all the dispersed polymeric binders present in the composition to the sum of all the dissolved polymeric binders present in the composition is 4:1 to 14:1, and at most 0.5 wt % of very volatile to very semi-volatile organic compounds (including coalescing agents, plasticizers and organic solvents) are contained therein, and at most 2 wt % of fillers (including lightweight fillers) are contained therein, and the pH is adjusted to 7.0 to 9.5, and the sum of water, fillers, very volatile to very semi-volatile organic compounds, pH adjusters and polymeric binders (a) to (c) is less than or equal to 100%.

The aqueous dispersion parquet adhesive according to the invention contains up to 39 wt % of water, preferably 27 to 39 wt %. Particular preference is given to 28 to 38 wt %.

When producing the dispersion parquet adhesive according to the invention, the water usually comes entirely from the added raw material dispersions and stock solutions. Preferably, water is not added separately.

The polyvinyl alcohol (a) contained as a binder and protective colloid in the dispersion parquet adhesive according to the invention is in dissolved form and is contained therein in an amount of at least 4 wt %, preferably 4 to 16 wt %. Particular preference is given to 5 to 14 wt %. Preferably, this is at least one polyvinyl alcohol having a degree of hydrolysis of 82 to 96 mol %. Particular preference is given to 83 to 91 mol %. Preferably, the weight-average molecular weight $M_W$ lies in the range from 10,000 g/mol to 200,000 g/mol. Particular preference is given to weight-average molecular weights $M_W$ in the range from 10,000 g/mol to 120,000 g/mol.

When producing the dispersion parquet adhesive according to the invention, the at least one dissolved polyvinyl alcohol (a) is added or submitted to the formulation as at least one aqueous solution, in solid form as a component of at least one water-dispersible dispersion powder of the vinyl acetate-containing polymer (b), and/or as a component of at least one aqueous dispersion of the vinyl acetate-containing polymer (b). Preferably, the polyvinyl alcohol is mixed into the formulation as at least one aqueous solution and as a component of at least one water-dispersible dispersion powder of the vinyl acetate-containing polymer (b). Particular preference is given to adding the polyvinyl alcohol as at least one aqueous solution, as a component of at least one water-dispersible dispersion powder of the vinyl acetate-containing polymer (b), and as a component of at least one aqueous dispersion of the vinyl acetate-containing polymer (b). Preferably, the aqueous PVOH solution contains 27 to 37 wt % polyvinyl alcohol, the water-dispersible dispersion powder of the vinyl acetate-containing polymer (b) contains 6 to 16 wt % polyvinyl alcohol, and the aqueous dispersion of the vinyl acetate-containing polymer (b) contains 1 to 5 wt % polyvinyl alcohol.

The at least one vinyl acetate-containing polymer (b) contained as a binder in the dispersion parquet adhesive according to the invention is water-insoluble and is in dispersed form. It is contained therein in an amount of at least 20 wt %, preferably 20 to 65 wt %. Particular preference is given to 26 to 62 wt %. It is preferably at least one polyvinyl acetate, at least one vinyl acetate copolymer, or a mixture of these polymers. Particular preference is given to vinyl acetate copolymers. Preferably, the comonomer content is 5 to 40 wt %. Particular preference is given to 10 to 20 wt %. Preferred comonomers are ethylene, crotonic acid, vinyl chloride, and esters of vinyl alcohol having 3 to 6 carbon atoms in the carboxylic acid component. Ethylene is a particularly preferred comonomer. Preferably, the glass transition temperature of the vinyl acetate-containing polymer lies in the range from −8° C. to 14° C., and particularly preferably in the range from −4° C. to 10° C.

When producing the dispersion parquet adhesive according to the invention, the at least one water-insoluble, dispersed, vinyl acetate-containing polymer (b) is advantageously mixed into the formulation in solid form as at least one water-dispersible dispersion powder and/or as at least one aqueous dispersion of the formulation. Preferably, the at least one vinyl acetate-containing polymer is added to the formulation as at least one water-dispersible dispersion powder. Particular preference is given to adding it as at least one water-dispersible dispersion powder and as at least one aqueous dispersion. Preferably, the aqueous dispersion contains 50 to 65 wt % vinyl acetate-containing polymer, and the dispersible polymer powder contains 84 to 94 wt % vinyl acetate-containing polymer.

The acrylate-containing polymer (c) contained as a binder in the dispersion parquet adhesive according to the invention is water-insoluble and is in dispersed form. It is contained therein in an amount of at least 3 wt %, preferably 3 to 33 wt %. Particular preference is given to 4 to 32 wt %. It is preferably at least one polyacrylate, at least one acrylate copolymer, or a mixture of these polymers. Particular preference is given to acrylate copolymers. Preferably, the comonomer content is 15 to 40 wt %; particular preference is given to 20 to 35 wt %. Preferred comonomers are styrene, butadiene, acrylonitrile and vinyl acetate, with styrene being a particularly preferred comonomer. Preferably, the glass transition temperature of the acrylate-containing polymer lies in the range from −7° C. to 17° C. Particular preference is given to the range from −2° C. to 12° C.

When producing the dispersion parquet adhesive according to the invention, the at least one water-insoluble, dispersed, acrylate-containing polymer (c) is mixed into the formulation as at least one aqueous dispersion and/or in solid form as at least one water-dispersible dispersion powder. Preferably, the at least one acrylate-containing polymer is mixed into the formulation as at least one aqueous dispersion having a solids content of preferably 45 to 60 wt %.

The dispersion parquet adhesive according to the invention may contain further polymeric binders such as methylhydroxyethylcellulose, further modified or unmodified carbohydrates, or also other natural or synthetic, water-soluble or water-dispersible polymers.

In order to obtain a functional dispersion parquet adhesive in accordance with the requirement profile defined under the object of the invention, the weight ratio of the sum of all the dissolved and dispersed polymeric binders present in the composition to water must be 1.5:1 to 3.0:1, preferably 1.6:1 to 2.7:1. Particular preference is given to 1.7:1 to 2.6:1.

Furthermore, the weight ratio of the sum of all the dispersed polymeric binders present in the composition to the sum of all the dissolved polymeric binders present in the composition must be 3:1 to 15:1, preferably 4:1 to 14:1.

The dispersion parquet adhesive according to the invention may contain up to 3 wt %, preferably up to 1 wt %, very volatile to very semi-volatile organic compounds. Particularly preferred embodiments do not contain any very volatile to very semi-volatile organic compounds. The organic compounds may be, inter alia, plasticizers, coalescing agents or organic solvents.

As plasticizers, use may be made, inter alia, of phthalates such as diethylhexyl phthalate, aliphatic cyclic carboxylic acid esters, aliphatic cyclic dicarboxylic acid esters such as 1,2-cyclohexane dicarboxylic acid diisononyl ester (Hexamoll DINCH), alkyl sulfonic acid phenyl esters and alkyl disulfonic acid diphenyl esters such as Mesamoll and Mesamoll II, or dipropylene glycol dibenzoate and other propylene glycol and ethylene glycol derivatives.

Coalescing agents may be, inter alia, ethers and polyether polyols such as ethylene glycol monobutyl ether (butyl glycol), dipropylene glycol methyl ether, propylene glycol phenyl ether, dipropylene glycol diphenyl ether, or ester alcohols such as butyl diglycol acetate or 2,2,4-trimethyl-1,3-pentanediol monoisobutyrate (Texanol).

Organic solvents may be, inter alia, alkanes such as n-pentane, n-hexane or cyclohexane, halogenated alkanes such as carbon tetrachloride, methylene chloride, chloroform or perchloroethylene (Per), alcohols such as methanol, ethanol, isopropanol, 1-butanol, ethylene glycol or glycerol, ethers such as diethyl ether, dibutyl ether, butyl methyl ether, phenyl methyl ether, tetrahydrofuran, triethylene glycol or triethylene glycol dimethyl ether (triglyme), carboxylic acids such as formic acid, propionic acid or linoleic acid, ketones such as acetone or methyl ethyl ketone, nitriles such as acetonitrile or benzonitrile, carboxylic acid esters such as methyl acetate or ethyl acetate, lactones such as γ-butyrolactone, lactams such as N-methyl-2-pyrrolidone, aromatic compounds such as benzene, toluene, pyridine or anisole, nitro compounds such as nitromethane or nitrobenzene, sulfones such as sulfolane, sulfoxides such as dimethysulfoxide (DMSO), carbon disulfide, carboxylic acid amides such as dimethylformamide, urea derivatives such as dimethylpropylene urea (DMPU), carbonic acid esters such as dimethyl carbonate, amines such as triethylamine, piperidine or aniline, or substance mixtures such as benzine, petroleum or petroleum ether.

Furthermore, the aqueous dispersion parquet adhesive according to the invention may contain up to 5 wt %, preferably up to 2 wt %, fillers and/or lightweight fillers. Particularly preferred embodiments do not contain any fillers or lightweight fillers. The fillers may be inorganic in nature, such as, inter alia, chalk, marble, limestone or precipitated calcium carbonates, kaolin, wollastonite, barium sulfate, silicates, pyrogenic or precipitated silicas, aluminates, aluminosilicates, sulfates, sulfides, nitrates, nitrides, phosphates, phosphides, ferrates, manganates, molybdates, carbides, or titanates. They may be organic in nature, such as, inter alia, cellulose, carbon black, graphite, graphene, carbon nanotubes (CNTs), thermosets such as bakelite, elastomers such as rubber, or textile material formed of natural or synthetic fibers. Or they are lightweight fillers such as, inter alia, Expancel® or other microscopic hollow bodies, expanded Perlite®, pumice or other lightweight stone, cork, or other porous natural or synthetic substances. In addition, it may also comprise mixtures of these fillers and/or lightweight fillers. The filler particles may additionally be modified, e.g., silanized or surface-hydrophobized by fatty acids.

The dispersion parquet adhesive according to the invention has a pH of ≥7.0, preferably from 7.0 to 9.5. Particular preference is given to a pH of between 7.5 and 8.5. To adjust the pH, the dispersion parquet adhesive according to the invention may contain organic or inorganic acids and/or bases, with preference being given to sodium hydroxide solution for alkalization and hydrochloric acid for acidification.

Furthermore, the aqueous dispersion parquet adhesive according to the invention may contain thickeners. These may be associative or non-associative. Preference is given to non-associative thickeners such as water-soluble, acrylate-containing polymers. Particular preference is given to water-soluble acrylate-carboxylic acid copolymers with ethylenically unsaturated carboxylic acids, which have glass transition temperatures in the range from 10° C. to 45° C., preferably from 15° C. to 40° C., and particularly preferably from 22° C. to 33° C.

Furthermore, the dispersion parquet adhesive according to the invention may contain preservatives. These may be, inter alia, 5-chloro-2-methyl-4-isothiazolin-3-one, 2-methyl-2H-isothiazol-3-one, 2-bromo-2-nitropropane-1,3-diol, 1,2-benzisothiazol-3-one, 2-octyl-2H-isothiazol-3-one, bis(3-aminopropyl)dodecylamine, butylbenzoisothiazol-3-one, sodium pyrithione, zinc pyrithione, ethylenedioxydimethanol, tetramethylolacetylene diurea, dodecylguanidine hydrochloride, 3-iodo-2-propynyl butylcarbamate, tetrahydro-1,3,4,6-tetrakis (hydroxymethyl)imidazo[4,5-d]imidazole-2,5(1H,3H)-dione, 2-t-butylamino-4-ethylamino-6-methylthio-s-triazine, N-(benzimidazol-2-yl) carbamic acid methyl ester, 3-(3,4-dichlorophenyl)-1,1-dimethylurea, 4,5-dichloro-2-octyl(2H)-isothiazolin-3-one, glutaraldehyde, 2,2-dibromo-2-cyanacetamide, or a mixture of these compounds. Preference is given to 5-chloro-2-methyl-4-isothiazolin-3-one, 2-methyl-2H-isothiazol-3-one and 2-bromo-2-nitropropane-1,3-diol.

Furthermore, the dispersion parquet adhesive according to the invention may contain defoamers. These may be, inter alia, liquid hydrocarbons, mineral oil emulsions, fatty acid polyethers, organopolysiloxanes, hydrophobic-hydrophilic block copolymers, polyether-modified polysiloxanes, 5-dimethylamino-2-methyl-5-oxopentanoic acid methyl ester, and/or triisobutyl phosphate. Preference is given to liquid hydrocarbons and polyether-modified polysiloxanes, with particular preference being given to polyether-modified polysiloxanes.

Furthermore, the dispersion parquet adhesive according to the invention may contain dispersing additives. These may be, inter alia, polycarboxylic acid copolymers, polyphosphates, polyalkylene glycol phosphates, modified polyurethanes, arylalkyl polyethers, polyglycol esters, and/or polyacrylates. Preference is given to polyacrylates and polyphosphates, with particular preference being given to sodium polyacrylate.

The dispersion parquet adhesive according to the invention may additionally contain surface-active substances. These may be, inter alia, fatty acid ethoxylates, castor oil ethoxylates, fatty alcohol ethoxylates, alkylphenol ethoxylates, alkyl sulfosuccinates, organopolysiloxanes, polyether polysiloxanes, fluorinated polyacrylates, ethylene oxide-propylene oxide block copolymers, and/or fatty alcohol polyglycol ether sulfates. Preference is given to fatty alcohol polyglycol ether sulfates and ethoxylated castor oil. Particular preference is given to sodium salts of fatty alcohol polyglycol ether sulfates.

In addition, the dispersion parquet adhesive according to the invention may contain adhesion promoters, rheological additives, pigments, dyes, resins, waxes, liquid extenders, antioxidants, UV light absorbers, and/or further protective colloids (in addition to PVOH).

If an additive, e.g., a dispersing additive, a pigment or a thickener, meets the general requirements for a polymeric binder (involved in building up adhesion, $M_W \geq 10{,}000$ g/mol, water-soluble or water-dispersible), it will be included in the calculation of quotients (I) and (K) (middle part of Table 2) at the relevant point. If it also meets the specific requirements for one of the polymeric binders (a), (b) or (c), it will be attributed to the appropriate one in each case.

The dispersion parquet adhesive according to the invention can be produced from the above components as follows (method A):

in a first step, optionally water and optionally an aqueous solution of the at least one polyvinyl alcohol (a) is mixed with an aqueous dispersion of the at least one acrylate-containing polymer (c) and an aqueous dispersion of 0 to 90 wt % of the total weight to be added of the at least one vinyl acetate-containing polymer (b) until homogenization is achieved, and in a second step, the at least one vinyl acetate-containing polymer (b) in the form of at least one water-dispersible dispersion powder is added to this mixture, with stirring, until the final concentration of the at least one vinyl acetate-containing polymer (b) is reached, and stirring is continued until homogenization is achieved, and in an optional subsequent step, all the other components of the aqueous dispersion parquet adhesive, such as pH adjusters, dispersing additives, pigments, dyes and/or defoamers, are added with stirring, and in a final step, stirring of the mixture is continued until homogenization is achieved, then the pH is checked and adjusted if necessary.

The production method advantageously has the special feature that the vinyl acetate-containing polymer (b) is added entirely or partially as a solid (dispersion powder) to the prepared mixture, which already consists of a polymeric binder-enriched dispersion or solution and dispersion. In this way, it is possible for the first time to set the unusually high ratio of polymeric binder to water compared to conventional dispersion parquet adhesives.

The production method proceeds similarly when advantageously the acrylate-containing polymeric binder (c) is added entirely or partially as a solid to the prepared mixture (method B):

in a first step, optionally water and an aqueous solution of the at least one polyvinyl alcohol (a) is mixed with an aqueous dispersion of the at least one vinyl acetate-containing polymer (b) and an aqueous dispersion of 0 to 90 wt % of the total weight to be added of the at least one acrylate-containing polymer (c) until homogenization is achieved, and in a second step, the at least one acrylate-containing polymer (c) in the form of at least one water-dispersible dispersion powder is added to this mixture, with stirring, until the final concentration of the at least one acrylate-containing polymer (c) is reached, and stirring is continued until homogenization is achieved, and in an optional subsequent step, all the other components of the aqueous dispersion parquet adhesive, such as pH adjusters, dispersing additives, pigments, dyes and/or defoamers, are added with stirring, and in a final step, stirring of the mixture is continued until homogenization is achieved, then the pH is checked and adjusted if necessary.

Of course, a combination of the two production methods is also possible, wherein some or all of the vinyl acetate-containing polymeric binder (b) and some or all of the acrylate-containing polymeric binder (c) are added as a dispersion powder, jointly or one after the other, to the prepared mixture consisting of optionally water, optionally dissolved polyvinyl alcohol (a), and dispersed polymeric binder (b) and/or (c), with stirring (method C).

The three production methods are characterized in that the at least one aqueous dispersion of the at least one vinyl acetate-containing polymer (b) and the at least one water-dispersible dispersion powder of the at least one vinyl acetate-containing polymer (b) also contain polyvinyl alcohol (polymer a) in addition to the vinyl acetate-containing polymer.

Hereinbelow, embodiments of the aqueous dispersion parquet adhesive according to the invention (Inv.1 to Inv.4), produced using the above components in accordance with the described production method (A), will be compared with reference examples not according to the invention (Ref.1 to Ref.3) (Tables 1 and 2).

TABLE 1

Raw material compositions (wt %) not according to the invention (Ref.1 to Ref.3) and dispersion parquet adhesives according to the invention (Inv.1 to Inv.4);

| Raw material | Ref. 1 | Ref. 2 | Ref. 3 | Inv.1 | Inv. 2 | Inv. 3 | Inv.4 |
|---|---|---|---|---|---|---|---|
| Mowiol 3-85 | — | 4.50 | 9.86 | 9.86 | 9.86 | 14.86 | 9.86 |
| Vinnapas DP500 | 38.64 | — | — | — | — | — | — |
| Vinnapas EP17 | — | 39.20 | 61.44 | 44.71 | 6.84 | 35.94 | 34.94 |
| Vinnapas 5010N | — | — | 28.00 | 28.00 | 28.00 | 30.47 | 36.47 |
| Acronal S533 | — | — | — | 16.73 | 54.60 | 18.03 | 18.03 |
| NaOH solution 20% | — | 0.65 | 0.70 | 0.70 | 0.70 | 0.70 | 0.70 |
| Benzoflex 9-88 | 5.00 | — | — | — | — | — | — |
| Water | 5.36 | 9.65 | — | — | — | — | — |

TABLE 1-continued

Raw material compositions (wt %) not according to the invention (Ref.1 to Ref.3) and dispersion parquet adhesives according to the invention (Inv.1 to Inv.4);

| Raw material | Ref. 1 | Ref. 2 | Ref. 3 | Inv.1 | Inv. 2 | Inv. 3 | Inv.4 |
|---|---|---|---|---|---|---|---|
| Kaolin EGS79 | 2.00 | 2.00 | — | — | — | — | — |
| Calcit MX30 | 32.00 | 24.00 | — | — | — | — | — |
| Omyacarb 40GU | 17.00 | 20.00 | — | — | — | — | — |
| SUM | 100% | 100% | 100% | 100% | 100% | 100% | 100% |

Legend for columns:

Ref. 1: Conventional dispersion parquet adhesive containing plasticizers; Ref. 2: Modern dispersion parquet adhesive containing no plasticizers; Ref. 3: Dispersion parquet adhesive not according to the invention, containing no dispersed acrylate-containing polymeric binder; Inv.1 to Inv.4: Dispersion parquet adhesives according to the invention;

Legend for rows:

Mowiol 3-85, Kuraray Europe GmbH: 32% aqueous PVOH solution having a degree of hydrolysis of 85.2 ± 1 mol %; Vinnapas DP 500, Wacker Chemie AG: 47.6% aqueous vinyl acetate homopolymer dispersion containing 2.4% PVOH and 50% water; Vinnapas EP17, Wacker Chemie AG: 57.2% aqueous vinyl acetate-ethylene copolymer dispersion containing 2.8% PVOH and 40% water; Vinnapas 5010N, Wacker Chemie AG: approx. 89% vinyl acetate-ethylene copolymer dispersion powder containing 11% PVOH; Acronal S533, BASF SE: 52% aqueous acrylate-styrene copolymer dispersion; NaOH solution 20%, Oqema GmbH: 20% aqueous sodium hydroxide solution; Benzoflex 9-88, Eastman Chemical Company: plasticizer oxydipropyl dibenzoate (dipropylene glycol dibenzoate); Kaolin EGS79, Erbslöh Lohrheim GmbH: washed, mill-dried kaolin having a mean particle diameter of 2 μm; Calcit MX30, sh Minerals GmbH: dry-ground calcite (calcium carbonate) having a mean particle diameter of 3.5 μm; Omyacarb 40GU, Omya AG: ground marble (calcium carbonate) having a mean particle diameter of 23 μm.

All the raw materials were available for purchase in the period from January to December 2021.

Ref1 is the composition of a conventional dispersion parquet adhesive containing a vinyl acetate homopolymer dispersion, mineral fillers, and plasticizers, and Ref.2 is the composition of a current dispersion parquet adhesive, corresponding to the prior art, containing no plasticizers, but containing mineral fillers, polyvinyl alcohol, and vinyl acetate-ethylene copolymer dispersion. Comparative example 3 (Ref.3) corresponds to the dispersion parquet adhesives according to the invention, except that it does not contain any acrylate-containing polymer.

Reference example 3 and examples Inv.1 to Inv.4 according to the invention were produced in accordance with production method (A).

Reference example 1 was produced in accordance with the components from Table 1 by

- in a first step, mixing water with the aqueous vinyl acetate homopolymer dispersion Vinnapas DP500 (Wacker Chemie AG) until homogenization was achieved, and
- in a second step, adding the plasticizer Benzoflex 9-88 (Eastman Chemical Company), with stirring, and mixing until homogenization was achieved, and
- in a third step, adding the fillers Kaolin EGS79 (Erbslöh Lohrheim GmbH), Calcit MX30 (sh Minerals GmbH) and Omyacarb 40GU (Omya AG), with stirring, and mixing until homogenization was achieved, and
- in a final step, checking the pH and assessing it as good.

Reference example 2 was produced in accordance with the components from Table 1 by

- in a first step, mixing water with the polyvinyl alcohol solution Mowiol 3-85 (Kuraray Europe GmbH) and the aqueous vinyl acetate copolymer dispersion Vinnapas EP17 (Wacker Chemie AG) until homogenization was achieved, and
- in a second step, adding the sodium hydroxide solution (Oqema GmbH), with stirring, and mixing until homogenization was achieved, and
- in a third step, adding the fillers Kaolin EGS79 (Erbslöh Lohrheim GmbH), Calcit MX30 (sh Minerals GmbH) and Omyacarb 40GU (Omya AG), with stirring, and mixing until homogenization was achieved, and
- in a final step, checking the pH and assessing it as well adjusted.

Table 1 shows the compositions of the formulated dispersion parquet adhesives Ref.1 to Ref.3 and Inv.1 to Inv.4 in weight percent, as well as the type, name, manufacturer and composition of the raw materials used (legend). Ref.1 is a conventional dispersion parquet adhesive containing vinyl acetate homopolymer, mineral fillers, and plasticizers. Ref.2 is a modern dispersion parquet adhesive corresponding to the prior art, containing no plasticizers, but containing mineral fillers, polyvinyl alcohol, and vinyl acetate-ethylene copolymer. Ref.3 is a filler-free dispersion parquet adhesive, not according to the invention, containing polyvinyl alcohol, vinyl acetate-ethylene copolymer, a ratio of polymeric binders to water according to the invention, a ratio of dispersed polymeric binders to dissolved polymeric binders according to the invention, but containing no acrylate-containing polymeric binder. Inv.1 to Inv.4 are dispersion parquet adhesives according to the invention containing polyvinyl alcohol, vinyl acetate-ethylene copolymer, acrylate-styrene copolymer, ratios of polymeric binders to water according to the invention, and ratios of dispersed polymeric binders to dissolved polymeric binders according to the invention.

A raw material may contain multiple ingredients. For example, Vinnapas DP500 (Wacker Chemie AG) contains water, polyvinyl alcohol, and vinyl acetate homopolymer. To obtain an overview of the composition of the actual ingredients, it is therefore necessary to calculate these from the composition of the raw materials and the quantities thereof that are used. The result is shown in Table 2, (A) to (H). Ref.1 to Ref.3 and Inv.1 to Inv.4 are as described by Table 1.

TABLE 2

Material compositions (wt %), derived quotients and measured values of dispersion parquet adhesives not according to the invention (Ref.1 to Ref.3) and according to the invention (Inv.1 to Inv.4);

| | Ref.1 | Ref.2 | Ref.3 | Inv.1 | Inv.2 | Inv.3 | Inv.4 |
|---|---|---|---|---|---|---|---|
| Ingredients | | | | | | | |
| (a) PVOH | 0.93 | 2.54 | 7.96 | 7.49 | 6.43 | 9.10 | 8.15 |
| B) VAc. homopolymer | 18.39 | — | — | — | — | — | — |
| C) VAc.-E. copolymer | — | 22.42 | 60.06 | 50.49 | 28.83 | 47.68 | 52.44 |
| D) Acr.-St. copolymer | — | — | — | 8.70 | 28.39 | 9.38 | 9.38 |
| E) Oxydipropyl dibenzoate | 5.00 | — | — | — | — | — | — |
| F) Water | 24.68 | 28.91 | 31.84 | 33.18 | 36.21 | 33.70 | 29.89 |
| (g) NaOH | — | 0.13 | 0.14 | 0.14 | 0.14 | 0.14 | 0.14 |
| (h) Mineral fillers | 51.00 | 46.00 | — | — | — | — | — |
| SUM | 100% | 100% | 100% | 100% | 100% | 100% | 100% |
| I) Σ polymer/$H_2O$ | 0.78 | 0.86 | 2.14 | 2.01 | 1.76 | 1.96 | 2.34 |
| K) Σ dispersed/Σ dissolved | 19.8 | 8.8 | 7.6 | 7.9 | 8.9 | 6.3 | 7.6 |
| Measured values | | | | | | | |
| I. Viscosity η | 84,800 | 72,400 | 114,800 | 54,400 | 75,200 | 103,200 | 162,600 |
| II. STF (20/5) | 0.45 | 0.44 | 0.71 | 0.40 | 0.33 | 0.44 | 0.42 |
| III. STF (20/1) | 0.17 | 0.17 | 0.42 | 0.13 | 0.08 | 0.17 | 0.14 |
| IV. Spreadability | 2 | 2 | 4 | 1 | 1 | 2 | 2 |
| V. Rib stability | 2 | 2 | 5 | 1 | 1 | 1 | 1 |
| VI. Tensile shear str. 1 mm 3 d | 3.9 | 3.2 | 3.9 | 3.4 | 3.0 | 3.7 | 3.7 |
| VII. Tens. shear str. pressed 3 d | 7.4 | 6.8 | 7.3 | 6.3 | 6.0 | 6.8 | 6.5 |
| VIII. Shear elong. γ 3 d | 1.1 | 1.2 | 2.9 | 2.2 | 2.4 | 2.6 | 2.9 |
| IX. Open time | 40 | 35 | 35 | 30 | 25 | 40 | 40 |
| X. Tensile shear str. 1 mm 28 d | 5.3 | 4.2 | 4.9 | 3.8 | 3.6 | 4.4 | 4.8 |
| XI. Tens. shear str. pressed. 28 d | 8.6 | 7.8 | 8.3 | 7.3 | 7.2 | 7.2 | 6.9 |
| XII. Shear elong. γ 28 d | 0.7 | 0.8 | 2.2 | 2.1 | 1.9 | 2.2 | 2.2 |
| XIII. Tens. elong. at break | 21 | 33 | 349 | 382 | 106 | 274 | 377 |
| XIV. Modulus of elasticity | 429 | 212 | 107 | 51 | 25 | 94 | 37 |
| XV. Wood swelling | 0.58 (10) | 0.42 (6) | 0.40 (6) | 0.43 (6) | 0.53 (8) | 0.44 (6) | 0.40 (6) |
| XVI. Tens. shear str. pressed 1 h | 0.2 | 0.11 | 0.19 | 0.33 | 0.31 | 0.06 | 0.08 |
| XVII. pH | 7.7 | 7.9 | 8.0 | 8.0 | 8.0 | 8.0 | 7.9 |
| XVIII. Density | 1.45 | 1.39 | 1.08 | 1.08 | 1.08 | 1.08 | 1.08 |

Legend for columns:

Ref.1: Conventional dispersion parquet adhesive containing plasticizers; Ref.2: Modern dispersion parquet adhesive containing no plasticizers; Ref.3: Dispersion parquet adhesive not according to the invention, containing no dispersed acrylate-containing polymeric binder; Inv.1 to Inv.4: Dispersion parquet adhesive according to the invention;

Legend for rows:

A) Sum of PVOH solid from Mowiol 3-85 and, if contained, from Vinnapas EP 17, Vinnapas 5010N and Vinnapas DP500

B) Polyvinyl acetate homopolymer solid from dispersion Vinnapas DP500 (without PVOH)

C) Sum of polyvinyl acetate-ethylene copolymer solid from dispersion Vinnapas EP 17 (without PVOH) and, if contained, from dispersion powder Vinnapas 5010N (without PVOH)

D) Solids content of the acrylate-styrene copolymer dispersion

E) Plasticizer oxydipropyl dibenzoate (propylene glycol dibenzoate)

F) Sum of water from Mowiol 3-85, Vinnapas DP500, Vinnapas EP17, Acronal S533, NaOH solution, and optionally separately added water G) NaOH solid from the sodium hydroxide solution H) Sum of the mineral fillers Kaolin EGS79, Calcit MX30 and Omyacarb 40GU I) Quotient of weight content of polymeric binders and weight content of water K) Quotient of weight content of dispersed polymeric binder and weight content of dissolved polymeric binder I. Viscosity η in mPa · s at 20 rpm (Brookfield DV2T-RV rotational viscometer, T = 20° C.)

II. Structural factor STF (20/5) as a quotient of the viscosity at 20 rpm and 5 rpm III. Structural factor STF (20/1) as a quotient of the viscosity at 20 rpm and 1 rpm IV. Evaluation of spreadability, graded (1-6; increments of 0.5)

V. Evaluation of rib stability, graded (1-6; increments of 0.5)

VI. Tensile shear strength in $N/mm^2$ after 3 days of adhesive curing at 1 mm thickness of the adhesive joint VII. Tensile shear strength in $N/mm^2$ after 3 days of adhesive curing of the pressed test specimens VIII. Shear elongation γ after 3 days of adhesive curing of a 1 mm-thick adhesive joint, in $N/mm^2$ IX. Open time in minutes TABLE 2-continued Material compositions (wt %), derived quotients and measured values of dispersion parquet adhesives not according to the invention (Ref.1 to Ref.3) and according to the invention (Inv.1 to Inv.4);

| | Ref.1 | Ref.2 | Ref.3 | Inv.1 | Inv.2 | Inv.3 | Inv.4 |
|---|---|---|---|---|---|---|---|

X. Tensile shear strength in $N/mm^2$ after 28 days of adhesive curing at 1 mm thickness of the adhesive joint
XI. Tensile shear strength in $N/mm^2$ after 28 days of adhesive curing of the pressed test specimens
XII. Shear elongation γ after 28 days of adhesive curing of a 1 mm thick adhesive joint, in $N/mm^2$
XIII. Tensile elongation at break as a percentage of the original length according to tensile elongation at break test after 28 days
XIV. Modulus of elasticity in $N/mm^2$ after 28 days
XV. Wood swelling according to wood swelling test as a maximum deviation of the lateral expansion from the original length in %; between parentheses: time in hours to reach the maximum value
XVI. Tensile shear strength 1 h after bonding as a measure of the setting rate, in $N/mm^2$
XVII. pH, measured using a pH meter (Mettler Toledo Five Easy)
XVIII. Density in $g/cm^3$
For measured values (I) to (XVIII), 10 independent experiments were carried out in each case (n = 10).

The data shows the weight ratio of the sum of all the polymeric binders to water (I) and the weight ratio of the sum of all the dispersed polymeric binders to the sum of all the dissolved polymeric binders (K). In an aspect, quotient (I) must be ≥1.5 and ≤3.0, and quotient (K) must be ≥3 and ≤15. Further minimum requirements for the composition according to the invention are a minimum PVOH content of 4 wt %, a minimum vinyl acetate-containing polymer content of 20 wt %, a minimum acrylate-containing polymer content of 3 wt %, a maximum very volatile to very semi-volatile organic compound content of 2 wt %, and a maximum combined filler and lightweight filler content of 5 wt %.

It can be seen from the top half of Table 2 that Ref.1 does not meet the requirements of rows (A), (B), (D), (H), (I) and (K); Ref.2 does not meet the requirements of rows (A), (D), (H) and (I), and Ref.3 does not meet the requirements of row (D). In contrast, Inv.1 to Inv.4 meet all the requirements placed on the composition.

Furthermore, in Table 2, rows (I) to (XVIII) show the measured values for the possible requirements placed on the dispersion parquet adhesive according to the invention, as formulated under the object of the invention. Specifically, these requirements are:

viscosity (20 rpm) of 50,000 to 200,000 mPa·s
structural factor STF 20/5≤0.45
structural factor STF 20/1≤0.17
spreadability of grade 1 to 2.5
rib stability of grade 1 to 2.5
 tensile shear strength after 3 and 28 days (pressed)≥3.0 $N/mm^2$
 →hard adhesive or
 tensile shear strength after 3 and 28 days (d=1 mm)≥2.0 $N/mm^2$ and shear elongation γ 0.5
 →hard-elastic adhesive or
 tensile shear strength after 3 and 28 days (d=1 mm)≥1.0 $N/mm^2$ and shear elongation γ 1.0
 →elastic adhesive
open time 20 minutes
 tensile elongation at break ≥75%
 modulus of elasticity ≥10 and ≤120 $N/mm^2$
 wood swelling ≤0.6% lateral expansion
 tensile shear strength one hour after bonding ≤0.8 $N/mm^2$
 density ≤1.1 $g/cm^3$ The processing properties include viscosity, structural factors, spreadability and rib stability. The mechanical characteristics include tensile elongation at break and modulus of elasticity, as well as tensile shear strength and shear elongation after 3 and 28 days of curing time. The open time, wood swelling and setting rate are adhesive properties in their own right.

The commercially available comparative examples Ref.1 and Ref.2 show acceptable measured values, corresponding to the requirements according to the invention, in respect of processing properties, open time, wood swelling, setting rate, tensile shear strength and shear elongation after 3 and 28 days. However, the requirements in respect of tensile elongation at break and modulus of elasticity are not met. Above all, the measured value for density is not at or below the maximum density of 1.1 $g/cm^3$ that is required according to the invention.

Ref3 meets the requirements according to the invention in respect of viscosity, mechanical characteristics, open time, wood swelling, setting rate and density, but not in respect of structural factors, spreadability and rib stability. The processing properties are poor.

In contrast, examples Inv.1 to Inv.4 according to the invention consistently meet all the requirements in respect of processing properties, mechanical characteristics, open time, wood swelling, setting rate and, above all, density.

In all the comparative examples and the embodiments according to the invention, a pH of ≥7.0 is set, in accordance with an aspect of the invention.

The mechanical characteristics in respect of tensile shear strength and shear elongation of Ref.1 and Ref.2 correspond to those of a hard and hard-elastic parquet adhesive, while those of Ref.3 and Inv.1 to Inv.4 correspond to the characteristics of a hard, hard-elastic and elastic parquet adhesive.

Overall, the experimental results show that the dispersion parquet adhesives according to the invention are clearly superior to the conventional ones in respect of shear elongation, tensile elongation at break and modulus of elasticity. In addition, the processing properties are better, in particular in respect of the rib stability. Ref.3 shows that at least one acrylate-containing polymer is essential for good processing properties.

In sum, the listed dispersion parquet adhesives according to the invention have the following advantageous properties:

1. Modulus of elasticity ≤10 to 120 $N/mm^2$
2. Tensile elongation at break ≥75%
3. Tensile shear strength after 3 and 28 days of curing (pressed)≥3.0 $N/mm^2$
4. Tensile shear strength after 3 and 28 days of curing (d=1.0 mm)≥2.0 $N/mm^2$
5. Shear elongation after 3 and 28 days of curing (d=1.0 mm)≥1.0
6. Viscosity (20 rpm)≥50,000 to 200,000 mPa·s
7. Spreadability≤2.5 (grade)

8. Rib stability≤2.5 (grade)
9. Structural factor STF 20/5≤0.45
10. Structural factor STF 20/1≤0.17
11. Open time ≥20 minutes
12. Density ≤1.1 g/$cm^3$
13. Wood swelling (lateral expansion)≤0.6%
14. Setting rate (tensile shear strength after 1 h of curing) ≤0.8 N/$mm^2$
15. Good adhesion to different types of wood and to different subsurfaces
16. Non-hazardous to the environment and to health
17. Advantages in respect of disposal and recycling
18. Sustainable and resource-efficient
19. Freely colorable The desire from customers for dispersion parquet adhesives of reduced density therefore does not come at the price of disadvantages in respect of mechanical characteristics, processing properties, wood swelling, setting rate or open time. On the contrary, surprisingly, there are even considerable advantages in this regard.

Together with the advantages in respect of sustainability and resource efficiency, protection of environment and health, recycling, disposal and choice of color, a new milestone in parquet bonding is achieved by the dispersion parquet adhesives according to the invention.

DEFINITIONS AND EXPLANATIONS

The following terms and definitions apply to the entire text of the present application.

Polymer: Polymers may be of natural or synthetic origin. They can be divided into thermoplastics, elastomers and thermosets depending on their mechanical-thermal behavior. However, the transitions between these classes are fluid rather than sharp. Thermoplastic polymers also always exhibit a partially elastic behavior. Conversely, elastomeric and thermosetting polymers always exhibit partially thermoplastic behavior. The mechanical properties of polymers are therefore referred to as viscoelastic. The elastic part can be characterized by the modulus of elasticity. The polymers used as binders have predominantly thermoplastic properties. Polymers have a weight-average molecular weight M w of 10,000 g/mol. (See also Hans-Georg Elias; Macromolecules, Volume 3: Physical Structure and Properties; Wiley-VCH Verlag GmbH & Co. KGaA, Weinheim; 2008; pp. 16 ff.).

Polymeric binder: Water-soluble and/or water-dispersible polymers which predominantly have thermoplastic properties and are suitable for building up adhesion between the substrate to be bonded and the subsurface. Polymers that are predominantly non-thermoplastic, such as e.g., ground rubber (elastomer) or bakelite (thermoset), are considered not polymeric binders, but rather fillers.

Copolymer: A polymer composed of at least two different types of monomers. The monomer that is in the highest proportion by weight is stated first in the name.

Homopolymer: A polymer composed exclusively of one type of monomer.

Polyacrylate: A polymer produced from at least one acrylic acid ester and/or acrylic acid. If further acrylic acid derivatives, such as methacrylic acid, methacrylic acid esters, acrylamide or acrylonitrile are contained therein, then it is an acrylate copolymer. The alcohol components of the acrylic acid esters may be, inter alia, methanol, ethanol, n-butanol, isobutanol, tert-butanol, 2-ethylhexanol, 1-dodecanol or, for crosslinking, also ethylenically unsaturated alcohols such as allyl alcohol. Depending on the proportion of free acid functions and other polar groups therein, polyacrylates are soluble or insoluble in water. Water-insoluble polyacrylates are commercially available as a solid (e.g., dispersion powder) or as a dispersion. Water-soluble polyacrylates are commercially available as a solid, as a dispersion or as a solution.

Acrylate copolymer: A polymer produced from at least one acrylic acid ester and/or acrylic acid and at least one further ethylenically unsaturated compound. The at least one further ethylenically unsaturated compound may be, for example, methacrylic acid, a methacrylic acid ester, acrylamide, acrylonitrile, vinyl chloride, a monounsaturated or polyunsaturated alkene such as, inter alia, ethylene, isobutene, butadiene, isoprene or limonene, a monofunctional or polyfunctional carboxylic acid such as, inter alia, crotonic acid, maleic acid, muconic acid or esters thereof, or an aromatic such as styrene. The alcohol components of the esters contained therein may be, inter alia, methanol, ethanol, n-butanol, isobutanol, tert-butanol, 2-ethylhexanol, 1-dodecanol or, for crosslinking, also ethylenically unsaturated alcohols such as allyl alcohol. Depending on the proportion of free acid functions and other polar groups therein, acrylate copolymers are soluble or insoluble in water. Water-insoluble acrylate copolymers are commercially available as a solid (e.g., dispersion powder) or as a dispersion. Water-soluble acrylate copolymers are commercially available as a solid, as a dispersion or as a solution.

Acrylate-containing polymer: A polyacrylate, an acrylate copolymer or another acrylate-containing polymer in which "acrylate" is not stated first in the name, i.e., does not form the main component of the polymer. This is a polymer in which acrylates are contained as the only monomers or among other types of monomers.

Acrylate-styrene copolymer: A polymer produced from at least one acrylic acid ester and/or acrylic acid and styrene, wherein additionally one or more ethylenically unsaturated compounds such as methacrylic acid, methacrylic acid esters, acrylonitrile, acrylamide, vinyl chloride, monounsaturated or polyunsaturated alkenes such as, inter alia, ethylene, isobutene, butadiene, isoprene or limonene, unsaturated monofunctional or polyfunctional carboxylic acids such as, inter alia, crotonic acid, maleic acid, muconic acid, esters thereof, or other aromatics may be contained therein. The alcohol components of the esters contained therein may be, inter alia, methanol, ethanol, n-butanol, isobutanol, tert-butanol, 2-ethylhexanol, 1-dodecanol or, for crosslinking, also ethylenically unsaturated alcohols such as allyl alcohol. Depending on the proportion of free acid functions and other polar groups therein, acrylate-styrene copolymers are soluble or insoluble in water. However, acrylate-styrene copolymers are usually insoluble in water and are commercially available as a solid (e.g., dispersion powder) or as a dispersion.

In language usage and in the literature, the term "styrene-acrylate copolymer" has become commonplace, even though acrylates are the main component of the copolymer. This nomenclature discrepancy will not be followed in the context of this disclosure.

Acrylate-carboxylic acid copolymer: A polymer produced from at least one acrylic acid ester and/or acrylic acid and other ethylenically unsaturated, monofunctional or polyfunctional carboxylic acids such as crotonic acid, maleic acid, muconic acid or methacrylic acid, wherein additionally one or more ethylenically unsaturated compounds such as acrylonitrile, acrylamide, vinyl chloride, monounsaturated or polyunsaturated alkenes, aromatics, or esters of carboxylic acids may be contained therein. The alcohol components of the esters contained therein may be, inter alia, methanol, ethanol, n-butanol, isobutanol, tert-butanol, 2-ethylhexanol, 1-dodecanol or, for crosslinking, also ethylenically unsaturated alcohols such as allyl alcohol. Depending on the proportion of free acid functions and other polar groups therein, acrylate-carboxylic acid copolymers are soluble or insoluble in water. Acrylate-carboxylic acid copolymers are commercially available as a solid (e.g., dispersion powder), as a dispersion or as a solution.

Polyvinyl acetate (PVAc): A polymer produced from the monomer vinyl acetate. A small proportion of the monomers used to produce this may also be other ethylenically unsaturated compounds, such as ethylene, crotonic acid, maleic acid or other unsaturated carboxylic acids, and esters thereof. Other esters of vinyl alcohol, such as vinyl propionate, vinyl butyrate or vinyl laurate, may also be contained therein in small amounts. Polyvinyl acetate is insoluble in water and is commercially available as a dispersion or as a solid.

Vinyl acetate homopolymer: Pure polyvinyl acetate composed exclusively of vinyl acetate monomers. Vinyl acetate homopolymers are insoluble in water and are commercially available as a dispersion or as a solid.

Vinyl acetate copolymer: A polymer produced from vinyl acetate and at least one other ethylenically unsaturated compound. Other ethylenically unsaturated compounds may be other esters of vinyl alcohol, such as, inter alia, vinyl propionate, vinyl butyrate, vinyl laurate, unsaturated carboxylic acids such as crotonic acid, muconic acid or maleic acid, and/or esters thereof. Depending on the proportion of free acid functions and other polar groups therein, vinyl acetate copolymers are soluble or insoluble in water. However, they are generally insoluble in water and are commercially available as a dispersion or as a solid.

Vinyl acetate-containing polymer: A vinyl acetate homopolymer, vinyl acetate copolymer, polyvinyl acetate or other vinyl acetate-containing polymer in which vinyl acetate is not stated first in the name, i.e., does not form the main component of the polymer. This is a polymer in which vinyl acetate is contained as the only monomer or as one of several types of monomers.

Vinyl acetate-ethylene copolymer: A polymer produced from the monomers vinyl acetate and ethylene, with vinyl acetate being present in a higher proportion by weight than ethylene. Vinyl acetate-ethylene copolymers are insoluble in water and are commercially available as a solid or as a dispersion.

Polyvinyl alcohol (PVOH): Polyvinyl alcohol is produced by hydrolysis (saponification) from polyvinyl acetate. The hydrolysis is generally incomplete, and therefore the polymer contains hydroxyl groups and acetate groups. The degree of hydrolysis typically lies in the range from 81 to 99 mol %. The lower limit of the degree of hydrolysis indicates when the polymer becomes soluble in water. Unless otherwise specified, one or more of these degrees of hydrolysis underlie the term "polyvinyl alcohol (PVOH)". Fully hydrolyzed polyvinyl acetate having a degree of hydrolysis of >99% does not form the subject matter of this disclosure. Above degrees of hydrolysis of around 97 mol %, the cold water solubility markedly decreases. PVOH having a degree of hydrolysis of 81 to 99 mol % is soluble in water and is commercially available as a solid or as a solution.

To be chemically correct, this polymer should actually be called "partially hydrolyzed polyvinyl acetate" or "partially esterified polyvinyl alcohol", but it will hereinafter be referred to simply as "polyvinyl alcohol". Purely formally, it is a copolymer of vinyl acetate and vinyl alcohol. (See also Ulrich Poth; Synthetische Bindemittel für Beschichtungssysteme; Vincentz Network GmbH & Co. KG, Hanover; 2016, p. 382).

Adhesive density: The density of the adhesive in g/cm$^3$, determined in accordance with DIN EN ISO 2811-1:2016-08; boundary conditions: temperature T=23±0.5° C., metal pycnometer with volume V=100 cm$^3$.

Tensile shear strength: The tensile shear strength of the bond, measured in accordance with DIN EN ISO 17178:2020-06; preparation of the test specimens with a pressed adhesive joint and with an adhesive joint having a layer thickness d of 1.0±0.3 mm

- in accordance with section 4.2 (pressed) and storage in accordance with section 4.2.4 (storage types a and b) and
- in accordance with section 4.4 (d=1.0 mm) and storage in accordance with section 4.4.4 (storage types a and b).

Shear elongation/shear elongation γ: The shear elongation γ or shear elongation is a dimensionless quantity and indicates the longitudinal deformation of a unit of thickness of an adhesive joint under a shear force in the tensile direction and is measured when measuring the tensile shear strength of an adhesive in accordance with DIN EN ISO 17178:2020-06; preparation of the test specimens in accordance with section 4.4 and storage in accordance with section 4.4.4 (storage types a and b).

Shear strength (Presso Mess): The shear strength of a bond is the force exerted by horizontal pressure on a specimen using the shear strength measuring device "Presso Mess" (manufacturer: Uzin Utz Tools GmbH & Co.KG, Ilsfeld, year of manufacture 2019) that leads to breakage of the bond between the specimen and the subsurface (see also "Adhesion properties").

Modulus of elasticity/tensile modulus: While the term "tensile modulus" is used in the describing standard DIN EN ISO 527-1:2019-12, the better-known term "modulus of elasticity" is chosen here. The modulus of elasticity is the quotient of tensile stress and tensile strain in the linear-elastic range of deformation of a solid body. This is a uniaxial tensile load on a cuboid body made of cured adhesive. The stress is the quotient of the tensile force and the surface area of the cuboid perpendicular to the tensile force. The modulus of elasticity is determined during tensile testing in accordance with DIN EN ISO 527-1:2019-12 with the following boundary conditions:

- test rate: 20 mm/min
- number of test specimens: n=10
- dimensions and shape of the test specimens in accordance with DIN EN ISO 527-2:2012-06, type 1B
- storage conditions in accordance with DIN EN ISO 17178:2020-06; section 4.4.4 (storage type b).

Tensile elongation at break: The tensile elongation at break is determined on a strip of cured adhesive. The adhesive strip is stretched under dynamic tensile load until it tears. The tensile elongation at break is the last extension value measured prior to tearing. This is specified as a percentage compared to the initial length. The measurement takes place in accordance with DIN EN ISO 527-1:2019-12 with the following boundary conditions:

- test rate: 20 mm/min
- number of test specimens: n=10
- dimensions and shape of the test specimens: DIN EN ISO 527-2:2012-06; type 1B.
- storage conditions: DIN EN ISO 17178:2020-06; section 4.4.4 (storage type b).

Mechanical properties: Dispersion parquet adhesives are based on polymers, the mechanics of which are characterized by thermoplasticity and elasticity, with the thermoplastic components predominating. The mechanical properties must be particularly balanced in order on the one hand to durably fix the parquet floor in place in a manner that is flat and as joint-free as possible, and on the other hand to suitably reduce, through deformation of the adhesive joint, the considerable stresses that wood can build up when changing its moisture content and thus its dimensions, so as to avoid destroying the parquet-adhesive-substructure composite. The dispersion parquet adhesive must therefore have balanced mechanics with a suitable modulus of elasticity, tensile shear strength and tensile elongation at break.

Open time: The open time is the period of time between application of the adhesive to the subsurface and the laying and pressing of the substrate to be bonded, during which the adhesive still sufficiently adheres to the substrate to be bonded, measured by the tensile shear strength in accordance with DIN EN ISO 17178:2020-06 with preparation of the test specimens in accordance with section 4.4 and storage in accordance with section 4.4.4 (storage type a). In accordance with said standard, the adhesive to be tested is applied to a mosaic parquet finger and, after a certain waiting time, a second mosaic parquet finger is pressed into the adhesive layer. A number of such test specimens are produced using waiting times of different length. After storage, the tensile shear strength is determined and is plotted against the waiting time. The maximum waiting time at which the requirements in respect of tensile shear strength in accordance with DIN EN ISO 17178:2020-06 (preparation of the test specimens in accordance with section 4.4 and storage in accordance with section 4.4.4 (storage type a)) are still met is the open time of the adhesive. The bonding of parquet elements is permanently secure if the elements are laid and pressed onto the adhesive bed within the open time of the adhesive. Dispersion parquet adhesives must have a relatively long open time of at least 20 minutes so that, during manual parquet installation, the adhesion between the adhesive and the parquet builds up over a sufficiently long period of time and thus a permanently strong bond is ensured.

Adhesion properties: The adhesion is tested by determining the shear strength using the shear strength measuring device "Presso Mess" (manufacturer: Uzin Utz Tools GmbH & Co.KG, Ilsfeld; year of manufacture 2019). A stop for the mechanical testing device is adhesively bonded to the subsurface to be tested, using a fast-curing, high-strength and high-modulus 2-component polyurethane adhesive. Test specimens made of the types of wood to be tested are bonded to the subsurface to be tested, using the adhesive to be tested, at a defined distance from the fixed stop. After a curing time of 3 days and 28 days for the adhesive to be tested, the test specimens are sheared horizontally from the subsurface under pressure loading by means of the Presso Mess device, and the maximum shear stress that occurs is noted as the shear strength (N/mm$^2$).

The test is carried out using test specimens made of oak, beech, maple, olive, wenge, iroko, ipe lapacho and/or cumaru on subsurfaces made of concrete, cement screed, calcium sulfate flowing screed, cement-based leveling compound and/or calcium sulfate leveling compound.

Pseudoplastic rheology, structural viscosity: Pseudoplastic rheology, structural viscosity or shear-thinning behavior is to be understood as the property of a liquid that causes the viscosity to fall as the shear rate increases. Pseudoplastic behavior must be distinguished from Newtonian behavior (viscosity does not change as the shear rate increases) and dilatant or shear-thickening behavior (viscosity increases as the shear rate increases) (see also Thomas Mezger; Das Rheologie-Handbuch; Curt R. Vincentz Verlag, Hanover; 2000).

The viscosity measurements take place using the rotational viscometer Brookfield DV2T-RV with single cylinder, spindle size R7, in accordance with DIN EN ISO 2555:2018-09 at 20° C. The rotational speed with the unit [rpm] is therefore specified below as a measure of the shear rate/shear gradient. The quotients of the viscosities at different speeds [η(20 rpm)÷ η(5 rpm)] and [η(20 rpm)÷ η(1 rpm)] are a measure of the shape of the viscosity-shear rate curve. The quotients are also referred to as structural factors (STFs), abbreviated as STF 20/5 or STF 20/1 depending on the set speeds. In the case of liquids with pseudoplastic rheology, the structural factors are less than 1. A dispersion parquet adhesive exhibits pronounced structurally viscous behavior if the structural factor STF 20/5 is 0.45 and the structural factor STF 20/1 is 0.17.

Dispersion parquet adhesives must have pronounced pseudoplastic rheology so that, on the one hand, adhesive applied to the subsurface by means of a notched trowel can easily be deformed to create adhesive beads and, on the other hand, the adhesive beads created remain dimensionally stable.

Wood swelling: Water contained in dispersion parquet adhesives is absorbed by the parquet wood as the adhesive sets, in each case at a rate and in a total amount that depends primarily on the water content of the adhesive and the water absorption capacity of the wood. The parquet wood swells as a result of absorbing water, thereby giving rise to corresponding dimensional changes of the parquet elements. To obtain a flat parquet floor that is as joint-free as possible, the wood swelling must be limited to an extent corresponding to a maximum total lateral expansion of the parquet elements of 0.6% in the wood swelling test.

To determine the swelling of the wood, lam parquet strips having a length of 250 mm, a width of 50 mm and a thickness of 10 mm, made of Canadian maple and having right-angled corners on all sides, is bonded to a defined subsurface (particleboard in accordance with DIN EN 312 P7, having a thickness of 40 mm; primed with an acrylate-styrene copolymer dispersion; to which a 5 mm layer of a cement-based self-leveling compound has been applied; primed with an acrylate-styrene copolymer dispersion). The strips have horizontal growth rings (flader cut). The dispersion parquet adhesive is applied to the subsurface using a notched trowel (TKB B 15). Immediately after the adhesive has been applied, 20 parquet strips are laid and pressed into the adhesive with the top side down and the long sides close to each other, so that the wood surface is completely wetted with adhesive. The individual parquet strips are oriented in such a way that the fiber direction of the parquet strips is perpendicular to the running direction of the adhesive ribs. Once the last strip has been laid, the parquet strips located next to each other are pressed together, so that a joint-free surface having a width of 100 cm is obtained. The zero value of the surface width is measured. Over the course of the next few hours, the wood gradually absorbs water from the dispersion parquet adhesive and changes its dimensions in all three spatial directions. The total growth in width of the 20 bonded strips is measured every 15 minutes from the zero value up to a time of 12 hours. The maximum value of the total lateral expansion occurs at a point in time within these 12 hours and is logged as the percentage growth in width.

Setting rate: The temporal development of the tensile shear strength of the parquet adhesive within the first hours after parquet bonding (storage at T=23° C. and relative humidity=50%), measured in accordance with DIN EN ISO 17178:2020-06 (preparation of test specimens in accordance with section 4.2 (pressed test specimens)). The development of the tensile shear strength over the first few hours largely determines the strength of the bond between subsurface, adhesive and parquet element. If the tensile shear strength develops before the water is absorbed by the wood, there is a risk of stresses occurring that may destroy the subsurface as the weakest link of the structure. For this reason, the setting rate of the adhesive must be tailored to the rate of water absorption by the wood, i.e., it must in no event take place too quickly. A setting rate that leads to tensile shear strengths of 0.8 $N/mm^2$ one hour after parquet bonding (storage at 23° C. and relative humidity of 50%), measured in accordance with DIN EN ISO 17178:2020-06 (preparation of test specimens in accordance with section 4.2), is considered sufficiently slow.

Dimensional stability: Dimensional stability describes the changes in size of bonded parquet that are brought about as a result of changes in the room climate, in particular the humidity. The dimensional stability can be measured through experimentation by storing a bonded parquet surface, with cured dispersion parquet adhesive, in an alternating climate.

Dispersion powder: A powder produced from an aqueous polymer dispersion by drying (e.g., spray drying, freeze drying), which redisperses when water is added, so that again an aqueous polymer dispersion is formed. Vinyl acetate-ethylene copolymer dispersion powders contain a protective colloid, which is contained therein in an amount of a few weight percent. This is usually polyvinyl alcohol. In addition, dispersion powders may contain small amounts of mineral fillers as antiblocking agents. However, the amounts used are so small that they do not exceed the upper limit for "permitted" technical impurities of 0.3 wt % in the dispersion parquet adhesive composition (see also "Fillers").

Coalescing agents: Semi-volatile organic compounds which are added to a dispersion parquet adhesive to lower the minimum film-forming temperature (MFT). Where a composition is declared free of coalescing agents ("does not contain"), no coalescing agents as such are added to the composition. However, they may be introduced from other components, in which they are contained as an additive or technical impurity for example, and in this way may be contained in the dispersion parquet adhesive composition in a content of up to 0.1 wt %.

Minimum film-forming temperature (MFT): The minimum film-forming temperature is the lowest temperature at which a drying polymer dispersion still forms a cohesive film (see also: Wassrige Polymerdispersionen; Editor: Dieter Distler; Wiley-VCH Verlag GmbH; 1999; p. 51 f.).

Plasticizers: Very semi-volatile organic compounds which are added to a dispersion parquet adhesive to lower the glass transition temperature (Tg) (see also Taschenbuch der Kunststoff-Additive; Editors: R. Gachter and H. Müller; Carl Hanser Verlag Munchen Wien, 3rd edition, 1989; p. 341 ff.). Where a composition is declared free of plasticizers ("does not contain"), no plasticizers as such are added to the composition. However, they may be introduced from other components, in which they are contained as an additive or technical impurity for example, and in this way may be contained in the dispersion parquet adhesive composition in a content of up to 0.1 wt %.

Glass transition temperature ($T_g$): The glass transition temperature is the temperature above which a polymer changes from a glassy state to a rubbery to viscous state.

Very volatile to very semi-volatile organic compounds: These are organic compounds which are liquid at room temperature and under standard atmospheric pressure and which have a boiling point of around 30° C. to 300° C. The organic compounds may be plasticizers, coalescing agents or organic solvents. Where a composition is declared free of very volatile to very semi-volatile organic compounds ("does not contain"), no very volatile to very semi-volatile organic compounds as such are added to the composition. However, they may be introduced from other components, in which they are contained as an additive or technical impurity for example, and in this way may be contained in the dispersion parquet adhesive composition in a content of up to 0.1 wt %.

Filler: Naturally occurring or synthetic inorganic or organic substances which are solid at room temperature, which are not water-soluble, which do not act as binders, and which are usually added in relatively large quantities to a dispersion parquet adhesive. The primary particles may have different shapes, e.g., round or fiber-like. The mean particle size typically covers a range from 0.02 μm to 70 μm (see also Detlef Gysau; Füllstoffe; Vincentz Network GmbH & Co. KG, Hanover; 2005). They are used to "fill out" the formulation and to adjust mechanical properties, viscosity and processing properties. In dispersion parquet adhesives, use is mainly made of mineral fillers—predominantly calcium carbonates. They are often the main component, being present in a content of 40 wt % to 60 wt %. Where a composition is declared free of fillers ("does not contain"), no fillers as such are added to the composition. However, they may be introduced from other components, in which they are contained as an additive or technical impurity for example, and in this way may be contained in the dispersion parquet adhesive composition in a content of up to 0.3 wt %.

Lightweight filler: Lightweight fillers are a subgroup of fillers having densities of well below one gram per cubic centimeter. They are added to the adhesive formulation in order to reduce the density. The mean particle size typically covers a range from 50 μm to 200 μm. Compared to classic mineral fillers, they cause a deterioration in the mechanical properties and processing properties. Where a composition is declared free of lightweight fillers ("does not contain"), no lightweight fillers as such are added to the composition. However, they may be introduced from other components, in which they are contained as an additive or technical impurity for example, and in this way may be contained in the dispersion parquet adhesive composition in a content of up to 0.3 wt %.

Molecular weight: Unless otherwise specified, "molecular weight" refers exclusively to the weight-average molecular weight $M_W$ using the unit grams per mole (g/mol), determined by gel permeation chromatography (GPC), also known as size exclusion chromatography (SEC) or molecular sieve chromatography.

Mean particle size: The mean particle size is the mean value of a particle size distribution, determined by laser diffraction (measuring device Sympatec Helos R2, R3, R4).

Water-insolubility: Substances which, at room temperature T=23° C. and under standard ambient pressure, dissolve in water to less than 0.1 g per liter are considered water-insoluble.

Conventional, customary, classic, modern, current or commercially available dispersion parquet adhesives:

These are dispersion parquet adhesives that correspond to the prior art.

Spreadability and rib stability: Both parameters concerning the processability of the dispersion parquet adhesive are evaluated according to a grading system, where 1 is the best grade and 6 is the worst grade. The processability is evaluated at a room temperature of 20° C. The grading takes place in increments of 0.5, with the individual grades having the following meaning:

Spreadability:

1=very good=very easy to spread
2=good=easy to spread
3=satisfactory=spreadable
4=adequate=some force has to be applied for spreading
5=poor=significant force has to be applied for spreading
6=inadequate=not spreadable Rib stability following the creation of adhesive ribs using a notched trowel:

1=very good=adhesive ribs retain their shape
2=good=adhesive ribs sag minimally, barely visible
3=satisfactory=adhesive ribs sag noticeably
4=adequate=adhesive ribs sag significantly
5=poor=adhesive ribs run almost completely
6=inadequate=adhesive ribs run completely

The invention claimed is:

1. An aqueous dispersion parquet adhesive that is in a ready to use state, and comprising up to 39 wt % of total water content in the dispersion, and the following at least three polymeric binders:

a) at least 4 wt % by solid content of at least one dissolved polyvinyl alcohol,
b) at least 20 wt % by solid content of at least one water-insoluble, dispersed, vinyl acetate-containing polymer,
c) at least 3 wt % by solid content of at least one water-insoluble, dispersed, acrylate-containing polymer, and optionally pH adjuster or pH adjusters, wherein the weight ratio of the sum of all the dissolved and dispersed polymeric binders present in the composition to water is 1.5:1 to 3.0:1, wherein the term “weight ratio” refers to the ratio of dry solid weights, and the weight ratio of the sum of all the dispersed polymeric binders present in the composition to the sum of all the dissolved polymeric binders present in the composition is 3:1 to 15:1, wherein the term “weight ratio” refers to the ratio of dry solid weights, and at most 2 wt % of volatile organic compounds are contained therein, and at most 5 wt % by the fillers’ solid content of fillers are contained therein, and the pH is neutral or alkaline, and the sum of water, fillers, volatile organic compounds, any pH adjuster, and polymeric binders (a) to (c) is less than or equal to 100% by weight.

2. The aqueous dispersion parquet adhesive according to claim 1, which contains 27 to 39 wt % of total water content and the following three polymeric binders:

a) 4 to 16 wt % by solid content of at least one dissolved polyvinyl alcohol,
b) 20 to 65 wt % by solid content of at least one water-insoluble, dispersed vinyl acetate copolymer, and
c) 3 to 33 wt % by solid content of at least one water-insoluble, dispersed acrylate copolymer, wherein the weight ratio of the sum of all the dissolved and dispersed polymeric binders present in the composition to water is 1.6:1 to 2.7:1, and the weight ratio of the sum of all the dispersed polymeric binders present in the composition to the sum of all the dissolved polymeric binders present in the composition is 4:1 to 14:1, and at most 0.5 wt % of volatile organic compounds are contained therein, and at most 2 wt % of fillers, are contained therein, and the pH is 7.0 to 9.5, and the sum of water, fillers, volatile organic compounds, pH adjuster or adjusters, and polymeric binders (a) to (c) is less than or equal to 100%.

3. The aqueous dispersion parquet adhesive according to claim 1, which does not contain any coalescing agents, plasticizers, or organic solvents.

4. The aqueous dispersion parquet adhesive according to claim 1, which does not contain any fillers.

5. The aqueous dispersion parquet adhesive according to claim 1, whose density, measured in accordance with DIN EN ISO 2811-1:2016-08, is ≤1.1 g/cm$^3$.

6. The aqueous dispersion parquet adhesive according to claim 1, wherein rib stability of the adhesive beads, created from the adhesive by utilizing a notched trowel, and spreadability, evaluated in accordance with a grading system in increments of 0.5 from 1 to 6, where 1 is the best grade and 6 is the worst grade, is ≤2.5.

7. The aqueous dispersion parquet adhesive according to claim 1, whose open time is ≥20 minutes.

8. The aqueous dispersion parquet adhesive according to claim 1, which has a viscosity, measured in accordance with DIN EN ISO 2555:2018-09 using a DV2T-RV Brookfield rotational viscometer, spindle size R7 at 20 rpm, is 50,000 to 200,000 mPa·s, and the structural viscosity for the structural factor STF 20/5 is ≤0.45 and for the structural factor STF 20/1 is ≤0.17.

9. The aqueous dispersion parquet adhesive according to claim 1, which meets the minimum requirements in respect of tensile shear strength and shear elongation in accordance with DIN EN ISO 17178:2020-06 for a hard, hard-elastic and elastic parquet adhesive after 3 and 28 days of curing time.

10. The aqueous dispersion parquet adhesive according to claim 1, wherein the tensile elongation at break of the cured adhesive, measured in accordance with DIN EN ISO 527-1:2019-12, is ≥75%.

11. The aqueous dispersion parquet adhesive according to claim 1, wherein the modulus of elasticity, measured in accordance with DIN EN ISO 527-1:2019-12, is 10 N/mm$^2$ to 120 N/mm$^2$.

12. The aqueous dispersion parquet adhesive according to claim 1, wherein the tensile shear strength, measured in accordance with DIN EN ISO 17178:2020-06, storage 4.2.4., one hour after bonding of the parquet is ≤0.8 N/mm$^2$.

13. The aqueous dispersion parquet adhesive according to claim 1, wherein the maximum lateral expansion of the parquet elements within the first 12 hours after bonding is ≤0.6%.

14. The aqueous dispersion parquet adhesive according to claim 1, which is colorable.

15. The aqueous dispersion parquet adhesive according to claim 1, wherein the volatile organic compounds have a boiling point of 30° C. to 300° C.

16. A method for bonding to a subsurface an object selected from the group consisting of a parquet made of wood, wood-block paving, bamboo floor coverings, and other wood material-based floor coverings, either untreated or fully or partially treated with wood flooring surface treatment agents, the method comprising applying to the subsurface the dispersion parquet adhesive according to claim 1.

17. The method according to claim 16, wherein the subsurface is selected from the group consisting of mastic asphalt, concrete, cement, cement screed, cement flowing screed, cement mortar, cement-bound wood fiber, ceramic, natural stone, calcium sulfate screed, calcium sulfate flowing screed, mineral leveling compound which is cement-based or calcium sulfate-based, wood, parquet, wood-based material, plywood, cork, gypsum, gypsum fiber, plasterboard, hardboard, textile fibrous material, polymeric material, laminate, foundation, and a combination thereof.

18. A method for producing an aqueous dispersion parquet adhesive, comprising:

in a first step, optionally water and optionally an aqueous solution of at least one dissolved polyvinyl alcohol (a) is mixed with an aqueous dispersion of at least one water-insoluble, dispersed, acrylate-containing polymer (c) and an aqueous dispersion of 0 to 90 wt % of the total weight of at least one water-insoluble, dispersed, vinyl acetate-containing polymer (b) is added until homogenization is achieved, and in a second step, the at least one vinyl acetate-containing polymer (b) in the form of at least one water-dispersible dispersion powder is added to the product of the first step, with stirring, until the final concentration of the at least one vinyl acetate-containing polymer (b) is reached, and stirring is continued until homogenization is achieved, and optionally, in a subsequent step, adding with stirring one or more agents selected from the group consisting of pH adjusters, dispersing additives, pigments, dyes, and defoamers, and in a final step, stirring of the mixture is continued until homogenization is achieved, and the pH is checked and adjusted if necessary.

19. The method for producing an aqueous dispersion parquet adhesive according to claim 18, comprising:

in a first step, optionally water and an aqueous solution of the at least one polyvinyl alcohol (a) is mixed with an aqueous dispersion of the at least one vinyl acetate-containing polymer (b) and an aqueous dispersion of 0 to 90 wt % of the total weight to be added of the at least one acrylate-containing polymer (c) until homogenization is achieved, and in a second step, the at least one acrylate-containing polymer (c) in the form of at least one water-dispersible dispersion powder is added to the product of the first step, with stirring, until the final concentration of the at least one acrylate-containing polymer (c) is reached, and stirring is continued until homogenization is achieved, and optionally, in a subsequent step, adding and stirring one or more components of the aqueous dispersion parquet adhesive selected from the group consisting of pH adjusters, dispersing additives, pigments, dyes and/or defoamers, and in a final step, stirring of the mixture is continued until homogenization is achieved, and the pH is checked and adjusted if necessary.

* * * * *